(12) United States Patent
Bennett

(10) Patent No.: US 9,460,216 B2
(45) Date of Patent: *Oct. 4, 2016

(54) WEB BROWSER ACCESSIBLE SEARCH ENGINE WHICH ADAPTS BASED ON USER INTERACTION

(71) Applicant: RPX CORPORATION, San Francisco, CA (US)

(72) Inventor: James D. Bennett, Hroznetin (CZ)

(73) Assignee: RPX CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,239

(22) Filed: Nov. 10, 2014

(65) Prior Publication Data

US 2015/0066889 A1    Mar. 5, 2015

Related U.S. Application Data

(63) Continuation of application No. 12/368,977, filed on Feb. 10, 2009, now Pat. No. 8,886,637.

(60) Provisional application No. 61/052,332, filed on May 12, 2008.

(51) Int. Cl.
*G06F 17/30* (2006.01)

(52) U.S. Cl.
CPC ... *G06F 17/30867* (2013.01); *G06F 17/30648* (2013.01); *G06F 17/30675* (2013.01); *G06F 17/30899* (2013.01)

(58) Field of Classification Search
CPC ................................................. G06F 17/30867
See application file for complete search history.

(56) References Cited

U.S. PATENT DOCUMENTS 7,827,170 B1 * 11/2010 Horling et al. ............... 707/722
2008/0114751 A1 * 5/2008 Cramer ............ G06F 17/30554

* cited by examiner

*Primary Examiner* — Rehana Perveen
*Assistant Examiner* — Alexander Khong
(74) *Attorney, Agent, or Firm* — Howison & Arnott, LLP

(57) ABSTRACT

A search engine (SE) is capable of adapting based on the user's interaction with search results/WebPages. Information, based on user interaction, is subsequently used to modify the priority of search results to create a more relevant search list that provides the user more relevant search information in a shorter period of time. The search engine adaptation takes place by calculating evaluation inputs based on user interaction with search results to compute a metric herein called as the desirability number for one or more search results. The desirability number (DN) is tagged as a search result or page attribute and is stored in the search engine server database in association with each search result or page. Based on the DN and other possible indicators, the resultant search list is modified to better prioritize search results that appear to be more meaningful to the user before continuing to present results to the user.

19 Claims, 10 Drawing Sheets

WEB BROWSER ACCESSIBLE SEARCH ENGINE WHICH ADAPTS BASED ON USER INTERACTION

CROSS REFERENCES TO PRIORITY APPLICATIONS

The present U.S. Utility patent application claims priority pursuant to 35 U.S.C. §120 as a continuation of U.S. Utility application Ser. No. 12/368,977, entitled "Web Browser Accessible Search Engine Which Adapts Based on User Interaction," filed Feb. 10, 2009, issuing as U.S. Pat. No. 8,886,637, which claims priority pursuant to 35 U.S.C. §119(e) to U.S. Provisional Application No. 61/052,332, entitled "Web Browser Accessible Search Engine Which Adapts Based on User Interaction," filed May 12, 2008, both of which are hereby incorporated herein by reference in their entirety and made part of the present U.S. Utility Patent Application for all purposes.

BACKGROUND

1. Technical Field

The present invention relates generally to computer-based search operations and more particularly to adaptive Internet search operations.

2. Related Art

Searching desired information on a subject of interest is a very common requirement in every field of expertise. Depending on the network domain a user is connected to, the search operation has a preset search space. Generally, there are two types of preset search spaces. A large search space, like the search space that results when searching across the entire Intranet, and a smaller search spaces that occur when a user's search in confined to limited data or a more-confined intranet domain.

Smaller search domains are generally easier to search and often provide more efficient access to more relevant information. For example, if a user is connected to a corporate intranet, his search is limited to that intranet domain and the search in therefore limited to the information in that domain whereby the user is said to be operating within in a small search domain. For a given search string, the amount, and quality of search results the user obtains is dependent on the environment in which the user is connected. Also, the search software in that intranet domain may have limited and more focused search capability that is confined to a specific search type or specific searchable data. In such cases, the search results may be confined to a specific type of information. For example, search results may be limited by specifying or limiting the search within a specific "Search Category," such as a search through an inventory list, specific design files, phone numbers, or limited set of data. Therefore, getting the data you want in real small search spaces that are not too complex is not often difficult. However, many search spaces including confined or limited search spaces are becoming more complex and more difficult to search these days.

The problem is even greater when searching over large search spaces, like when a client machine is connected to the Internet, a wide network, or very large Intranet. In these cases, the search construct, algorithm, and data sources are often much broader than what is required or available on a local intranet. On the Intranet, there may be no well-defined search category and/or there may be no limited search data space. On the Internet, the search domain is often entire Internet or a vast search space, and performing a search by using a relatively unbounded keyword or string of keywords is common in such cases. Therefore, the searching of large or complex search spaces is not only difficult, it is becoming the common mode of searching for most computer users.

In the large Internet scenario, when the client machine is connected to the Internet and a relatively unbounded search operation is performed, the search results becomes so huge, numerous, and expansive that it becomes very difficult to narrow down the search results to specific information that is of high relevance (or of high quality) to the user's requirement(s)/needs. In this situation finding the most relevant pages or information sources from huge set of search results must happen through manual exploration and human interaction with a vast number of search results. Even after a long time spent exploring relevant pages, it is not guaranteed that a user will find the webpages or search results of high relevance to their topic of search. This manual approach to finding relevant and quality content from the search may sometimes lead to poor sources of data, wrong conclusions, and frustration in spite of having spent a large amount of time browsing and processing search results.

BRIEF SUMMARY OF THE INVENTION

The present invention is directed to an apparatus and various methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
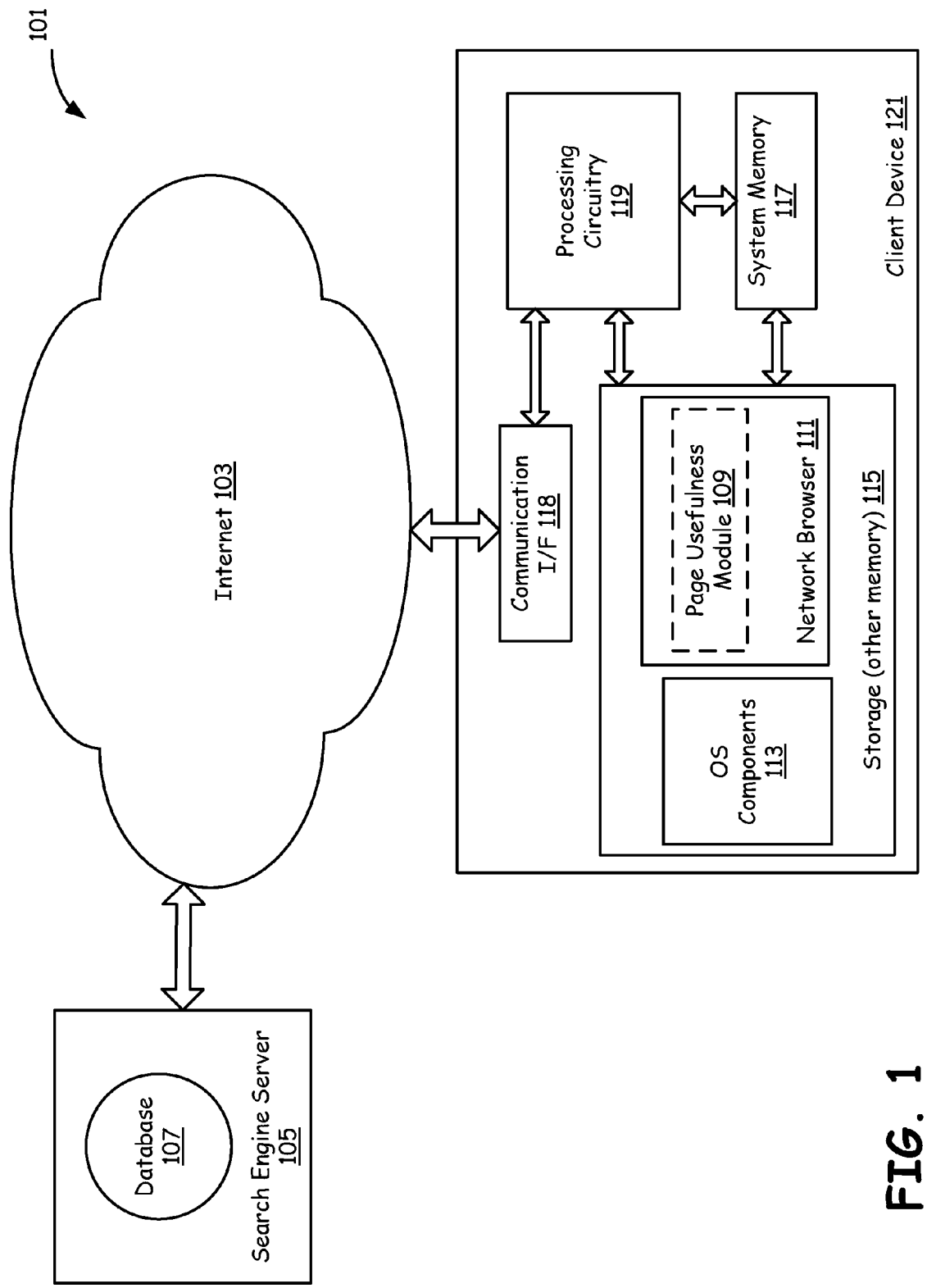
FIG. 1 is a system block diagram illustrating a Search Engine (SE) Server and Client Machine connected to the Internet where the SE comprises an adaptable Search engine.

There is a need in the art for an apparatus and a process that can search a large or complex search space where many search results are returned, whereby the apparatus or process can narrow or better identify search results that are of interest to the user, preferably in shorter periods of time.

According to the present invention, a Search Engine (SE) is capable of adaptively learning or deriving over time the requirements that drive the user to value certain information over other information within their domain of search results. The learning process of this adaptive SE begins when the SE receives a search string from a search field input mechanism of the SE. The search string may be provided along with additional information or interaction provided by the user that compliments or modifies the search string information. Other interaction with the user or information from the user may include providing input that limits certain sources of data available from the search, certain date restrictions, the input of identifiers that are used to exclude certain information from a search, content restrictions (i.e., search only pictures, or search only PDF files, etc), and like information. On top of this initial information, user information gathered from the user's interaction with the webpage and the SE program itself may be processed to provide a metric that the SE can use for guiding the user to search results that are more likely to be acceptable and interesting to the user. In other words, by processing the user's interaction with the SE, the client computer, and the search results, the SE can begin to determine which type of search results or characteristics within one or more search results are valued by the user.

With this adaptive deduction, which can change over time, the SE can either generate a modified search list with higher quality and more relevant search results for the user, or better steer the user to specific quality content within the larger domain of returned search results. This modified search list or more-optimally-focused content that is identified by the SE will be far smaller in quantity and/or size and more manageable by the user when compared to the original search results obtained from just processing the original search string and/or search input from the user. Once given a smaller set of more relevant information, the user can browse more relevant search results to obtain the information they seek in a shorter period of time, with improved results. Therefore, the search adaptation algorithm within the SE works with the original (or updated) search string(s) provided by the user, along with a page desirability number (s) computed based on the user's interaction with one or more webpages or search results from the first paginated subset of large search results, along with some possible sources of other adaptive information, in order to obtain relevant and focused search results in a shorter period of time for the user.

If the Search Engine (SE) is going astray by misinterpreting user action or by poorly judging user input/interaction, the user can naturally progress down a different search path to positively influence the SE or change their behavior or interaction with the search results or SE to "course correct" the adaptive algorithm of the SE. In other embodiments, the user may change the search by starting with a new search string or reset back to the original search string and SE state and continue down a different and more-informed interaction path with the SE to get improved results. In addition, or in lieu of the foregoing, the user can provide different or additional logical search operators, such "OR" and "AND," to take the SE down a different adaptive course of search (i.e., steer the SE) over time. The term "OR" is used to group synonymous terms where at least one of the user provided terms must be present, and the use of the term "AND" is used to connect terms where both or all of the terms must be present.

In another embodiment of the present invention, a user can use control widgets (in the form of one or more small pop up windows or other interactive structure(s) on the user interface device), to provide explicit feedback on one or more webpages or search results. The feedback may indicate that the user wants more information similar to this current search result he is viewing or interacting with, or may indicate that the user wants less information that is similar to this current search result, or anything in between. User feedback that is provided through the control widget may be used by the SE to alter or adapt the search algorithm. This processing allows the SE to find more meaningful and quality search results for the user in a shorter period of time.

Subsequently, within an optimized search list or original search list, the frequency of "back" arrow and "forward" arrow hits and/or the time spent scrutinizing material within each search result also helps to further adapt the SE algorithm to obtain more quality search results. The concept behind this approach is as follows. If the user does not like a page he has browsed through, he tends to hit the back arrow on the network browser window quickly, often, or rapidly, to return to the original page or original top-level search list. Once back to the search list or a prior search page, the user may use a forward arrow down a path of more relevance. If the user feels like they have missed something in the recently browsed page or search result or sees a new path of interest, they may browse through a different browse path or a different link. A "link" is a connection from one web resource to another, and following the behavior of how a user traverses links can allow the SE to adapt search results to provide more quality search material similar to the links and content he appears to be favoring. Furthermore, a user is likely to spend more time down paths and on webpages that are more relevant to his search. So, in some cases, following links may cease, but a user spends significant time on one page. This can be a strong indicator of content that the user find useful.

In one embodiment, each time a user selects and interacts with search hits identified by a search engine, that engine learns from the user's interaction with the hits and adapts to produce a more likely set of subsequent brief/preliminary hits when the user presses the "next" button. The search engine responds to search requests by delivering generic hits results like hits 1-10 of 10,000 hits for a specific search string/input. Users that enter the same search string will often all receive the same results, but over time, as the users start interacting with the search data and start making selections the search results and provision of search results from the SE will change.

In one embodiment, a search engine database stores user interaction related to the search session, such as next page operations, back page operations, duration of time between selections, time spend in a single selection, time spent viewing certain content, specific item selected and how often, common keywords or key characteristics in adjacent selections, visit duration associated with a selection, etc. All of such parameters are then used to construct a desirability number (DN). Based on the desirability number (DN), the sequence of results for future search requests or the priority of organization for the current search results for further "next" button selections can be modified to prioritize more relevant content "up front" for the user. In some embodiments, search results that seem disconnected or not relevant to the user's current apparent interest are factored into the analysis to determine not only what the user desires, but also what the user may not desire. So, negative or positive information about what a user is attracted to is useful, alone or in combination, when determining what material should be prioritized for user viewing. Furthermore, in some embodiments that progress over time, searched content that may receive low DN numbers and seem of no interest to the user can be filtered out of the search results, while newer results that were not found on the original search may now be pulled into the search result list for the first time because and understanding of what the user desires allows the SE to better collect meaningful search results in and out of the initial search result lists. In other embodiments, lower percentages of new sites having no or minimal past evaluations are weaved into the sequence for further consideration.

Desirability information for a user may also be used for future searches done by the same user (e.g., the same user may search for extended period of time over similar content with similar interests). Or, desirability information from a former user may be used for subsequent users of the same or similar search terms if it appears that the new user is looking for information similar to the prior user. For example, during the Olympics, may people may be entering searches about "swimming gold medals" and like search strings. If another user enters "swimming gold," the SE may infer that since other users are searching this topic in bulk that this user may mean to do a similar search, instead of search for gold colored swim suits. Then again, the SE may be wrong and the user can refine their search, go to more sites related to their topic of interest (possible gold swim suits), or enter user input to better guide the SE to better results. In one embodiment, pages in which the user spends a lot time and/or steps through to further/deeper links, etc., are used to further refine search terms and assist in producing a different list of more relevant hits when the "next" button is pressed to bring up more search results. A quick assessment followed by a quick window closure of an offered site or frequent or quick back arrowing probably indicates that the site is not what the user is looking for, and such information is used to screen or delete similar sites from the "next" set of most likely hits. The SE may also query the user via usefulness questions through control widgets, whereby search relevance information can be requested or offered to the SE directly from the user if needed to verify a conclusion of usefulness or degree of usefulness or further refine a search.

Thus, the adaptation of the search algorithm and the refinement of search results by running an adaptation algorithm in the Search Engine (SE) based on certain metrics generated by the user's interaction helps the user (or searching entity/apparatus) narrow large sets of search results down to more relevant and higher-quality search content in a shorter period of time, thereby often reducing the time spend searching and often improving the quality of the information obtained in the end, as well as improving the completeness and accuracy of conclusions drawn by the end user.

FIG. 1 is a system block diagram 101 illustrating a Search Engine (SE) Server and Client Machine connected to Internet, the system comprising an adaptable Search engine. Search engine server 105 and client machine 121 are communicatively coupled via the Internet 103. The search engine server 105 may be a more powerful server computer, a set of server computers, a web of many computers across several interconnected networks and intranets, a client machine, handheld device, or other computing device. The client device 121 is most often an end user device such as a phone, mobile internet device, laptop, desktop, or other personal computing device, but is some cases may also be a more powerful server based machine or workstation. A communication interface 118 couples the client device 121 to the Internet 103 via one or more wired and/or wireless links. For example, when the client device 121 is a desktop computer or a laptop computer, the communication interface 118 may be a wired Ethernet Interface or a Wireless Local Area Network (WLAN) interface. When the client device is a portable device such as a laptop computer, data terminal, or cellular telephone, for example, the communication interface 118 may be a cellular interface, a Wireless Wide Area Network (WWAN) interface, e.g., WiMAX interface, a WLAN interface, or another type of wireless interface. Any of these client devices 121 may support one or more of either/both wired and wireless interfaces. The Search Engine Server 105 also includes a communication interface, processing circuitry, and memory. The structure of the Search Engine Server may be same/similar as that of the client device 121.

A network browser 111 runs as an application program over the client Operating System (OS) 113. All or a substantial portion of the system software and application software components reside in the system Storage (other memory) 115, which is usually computer readable medium or memory devices of some sort, such a flash disk, hard drive, nonvolatile memory, or the like. All the applications are run by a central processing unit or processing circuitry 119, after being loaded into System Memory 117. System memory 117 is often static random access memory (SRAM), dynamic random access memory (DRAM), cache, a peripheral IC chip, or some other computer readable medium. Storage associated with the search engine server 105, stores large amount of information of various types and is called the database 107. Again, the database may be largely local, or distributed in over vast geographies with many layers of interconnectivity. Page usefulness module 109 is often a software component of network browser 111, used by the user as an option (e.g., control widget) for entering their opinion regarding the usefulness of a current page or search result. In some cases, especially in circumstances where greater security is required, the module 109 may contain hardware components as well.

Figure 2:
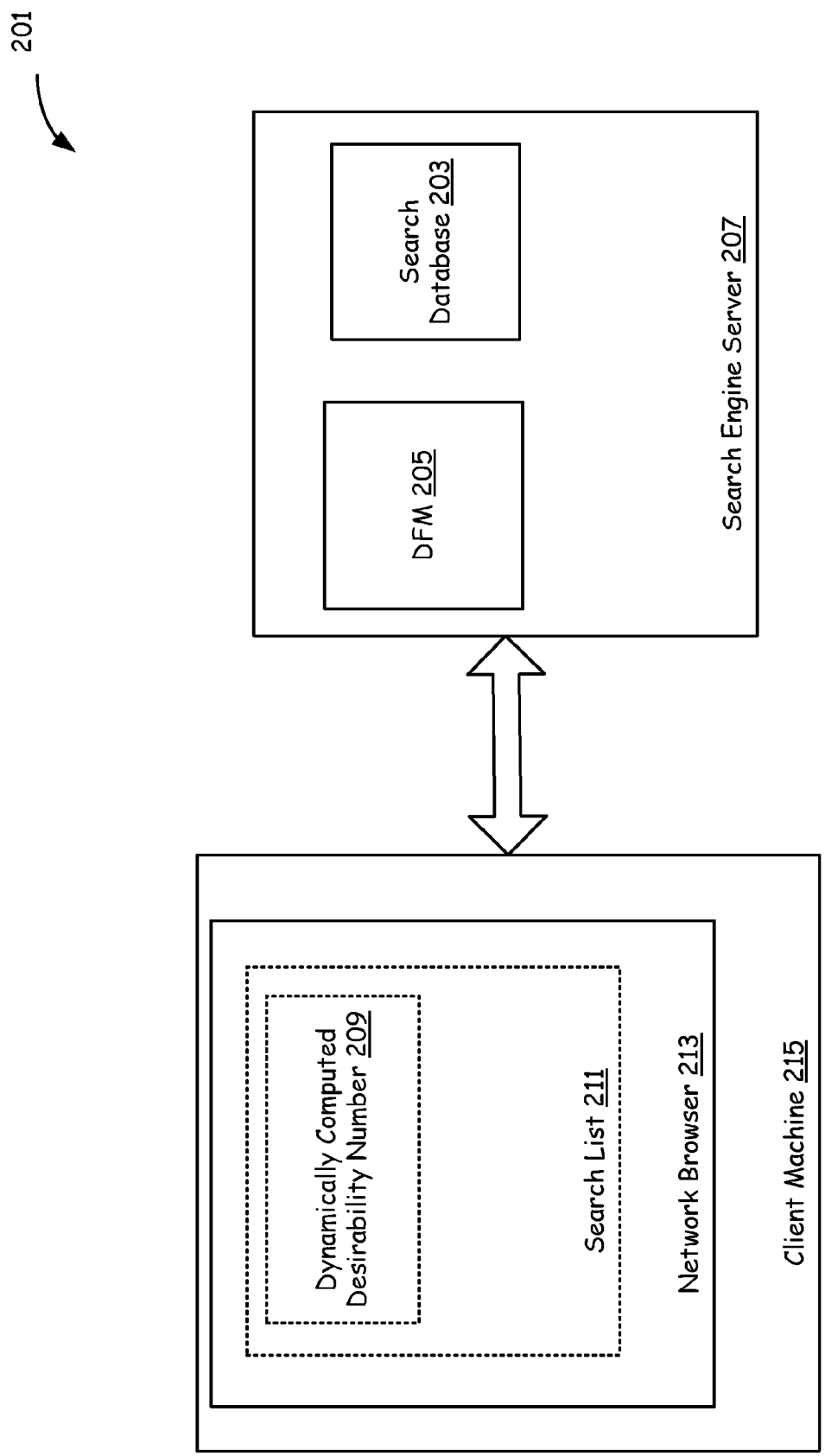
FIG. 2 is a perspective block diagram functionally illustrating the components of a client machine and a search engine for search adaptability features.

FIG. 2 is a block diagram 201 functionally illustrating the components of a client machine and a search engine that employs search adaptability features. In FIG. 2, a search engine server 207 (similar to the server 105 illustrated in FIG. 1) comprises Desirability Function Module (DFM) 205 and the search engine storage Search Database 203. The DFM 205 and the Search Database 203, in many embodiments, are simply software components stored in memory of the search engine server 207 and executed by processing circuitry of the search engine server 207. The Search Engine Server 207 communicates with the Client Machine 215 (similar to the client machine 121 of FIG. 1) by invoking the search engine that contains the server's link name or identity information in the Network Browser 213 (similar to browser 111 of FIG. 1) or some other computer readable location. When a specific search string (and optional other related search information) is typed in the Network Browser 213, a search list 211 will start appearing on the client machine in response to the server and/or client processing of the search. As an example, the first 10 or 100 search results may be displayed via the client machine 215 after execution of the search, yet the server and/or client may have found and queued up many more search results (e.g. 10,000 or more search results) beyond this initial display of the first search results. Any number of search results, and any number of pagination for search result presentation to the user is possible.

A page, piece of content, or website from the Search List 211 can be opened by clicking on its link. According to one embodiment, a page attribute can be tagged to a page or search result depending on certain dynamically assessed inputs. Such inputs may be one or more of the next page hit, a profile of the user, duration of time between selections, specific item selections, visit duration associated with a selection, etc. These attributes can be processed to qualify a page on a number scale called the Desirability Number (DN) 209. The DN 209 is typically computed by the DFM 205, as shown in FIG. 2. Finally, these pages along with desirability number information can be saved in a search engine database 203. The stored page's link(s) along with the desirability number 205 information can be made accessible to the same or subsequent users who may be interested in similar search results.

Figure 3:
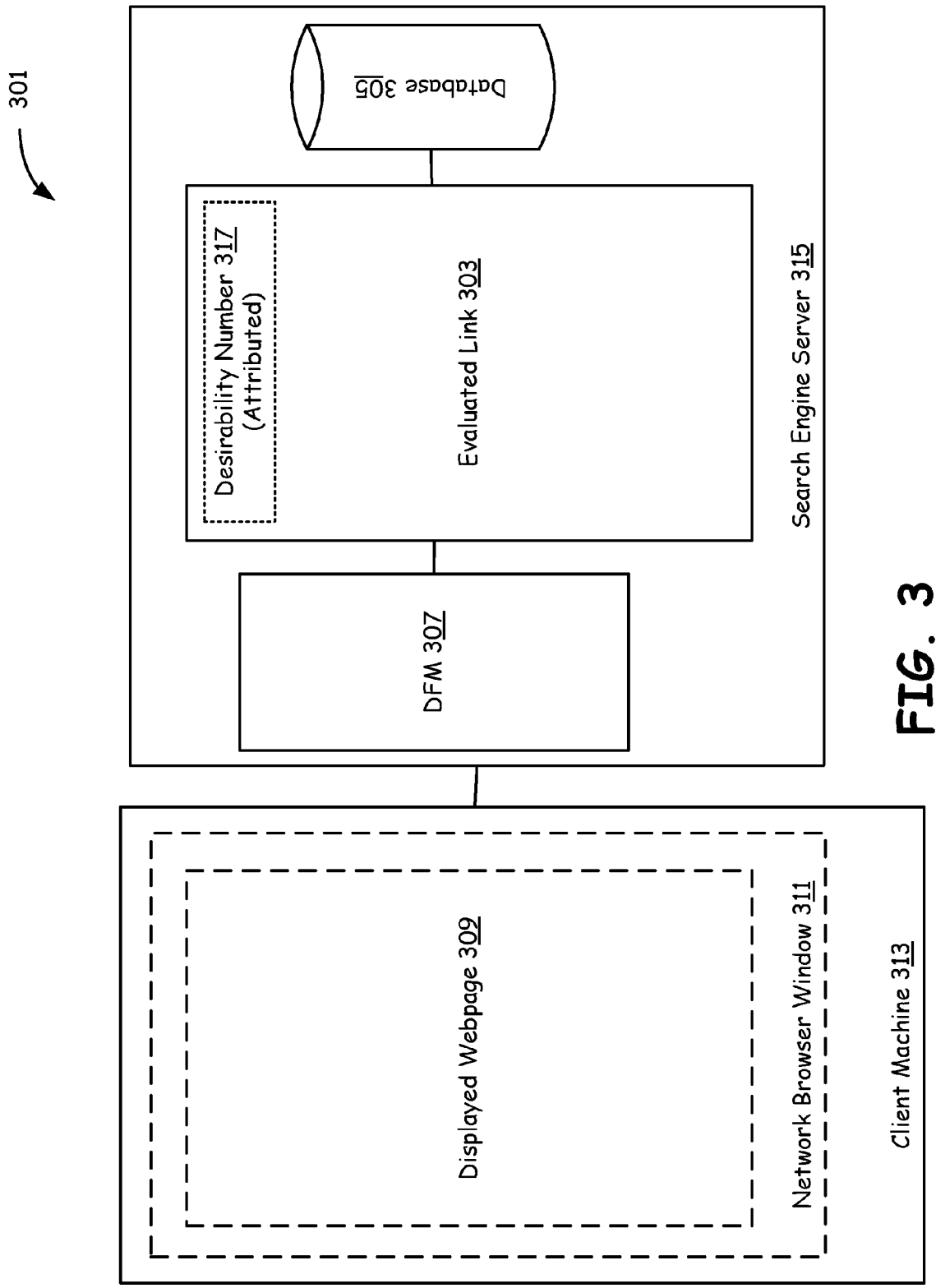
FIG. 3 is a functional block diagram illustrating the interaction of essential components of client machine and the search engine server for implementing the search adaptability.

FIG. 3 is a functional block diagram 301 illustrating the interaction of components of a Client Machine 313 and a Search Engine Server 315 for implementing an adaptive Search Engine. In accordance with this embodiment, the desirability function module (DFM) 307 (similar to the DFM 205 of FIG. 2) remains as the part of the Search Engine Server 315. The search engine processes page evaluation parameters, search attributes, or page attributes derived from the remote screen Displayed Webpage 309 within the Network Browser Window 311, of the Client Machine 313, and they are captured as inputs to DFM 307. Based on these inputs, the generated Desirability Number 317 (same as the desirability number 209 of FIG. 2) will be tagged to the Evaluated Link 303 on the Search Engine Server 315, corresponding to the Displayed Webpage 309 on the Client Machine 313. This Evaluated Link (page) 303 can be stored in the Database 305 of Search Engine Server 315 to be used in the subsequent browse session by the same or different users. Thus, the desirability number can be stored in one or both of server memory or client memory in order to enable the adaptive searching taught herein.

Figure 4:
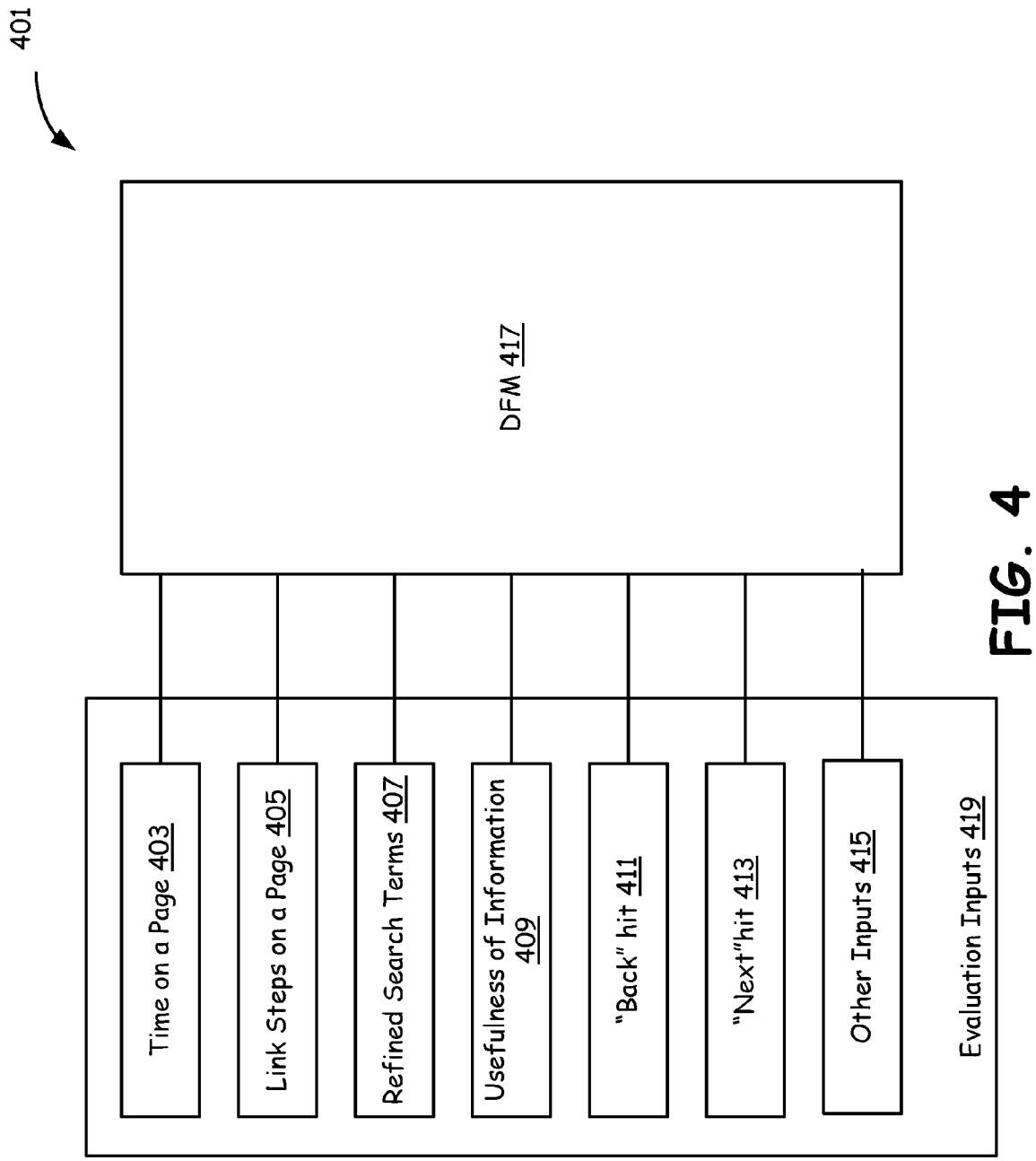
FIG. 4 is a functional block diagram illustrating a desirability function block for computing the desirability number.

FIG. 4 is a functional block diagram 401 illustrating a DFM for computing a Desirability number for a specific webpage or search result. A DFM block 417 processes some functional form of one or more inputs, illustrated as one or more of the Evaluation Inputs 419 in FIG. 4. The DFM's processing and provision of the evaluation inputs is generally performed by the Processing Circuitry 119 of FIG. 1, often in conjunction with the system memory 117 of FIG. 1 or other components. There are various measurable (quantifiable) inputs that are collected and communicated to the desirability function module (DFM) block 417. These inputs basically are some record of user operations, user characteristics, user entered information, time durations, counts of the kind of content observed or interacted with, or like information detected by a Search Engine Server 315 or invoked on the Client Machine 313 via user interaction with a Network Browser 311, (see FIG. 3).

The Evaluation Inputs 419 comprises one or more inputs, such as the Input Time on a Page 403, which is the time difference between the entry time and exit time of a search result or webpage as measured by the Search Engine Server 315 of FIG. 3 or another computing means such as the client 313. These inputs may be weighed by characteristics of the content being viewed. For example, if a user spends a lot of time on a very complex website, it may not be because the content was useful, it may be because the content was so complex or wide in scope that the user took a long time to dismiss the content as valuable. In one embodiment, the larger this input value, the more interested the user will generally be regarding the content of this page or search result. Therefore, a greater number for this input 419 results in the enhancement of the Desirability Number 209 or 317 in FIGS. 2 and 3 respectively. In other embodiments other indicators other than numerical numbers may be used as inputs to be processed.

The Evaluation Inputs 419 is an input referred to as the Link Steps on a Page 405. If a user browses more links within this page or browses deeper into links contained within this search result, node, or webpage, then this activity increases the Desirability Number 209 of FIG. 2. The more links activated by the user in this page and the deeper the link chain within this page, the higher the Desirability Number.

Another possible input to the DFM block 417 is labeled Refined Search Terms 407. This search term modifies the search list that will open on the subsequent "Next" hit. The subsequent search list will grow in size if the Refined Search Terms 307 is smaller than the original search term, and will become smaller in size if it Terms 307 are more restrictive than the original search (usually meaning that more conditions or search terms (words) are now added to the search terms). Other features that impact on the size of the subsequent list are logical ANDing and ORing, used in the search string, for e.g. "term1 AND term2" and "term1 OR term2" will have different impact during the search operation. ANDing has a more limited Search Space than ORing. The term "Search Space" means, the space of available data in the physical storage (hard disk memory) distributed across numerous servers connected to vast Internet that satisfies the search term.

The Evaluation Inputs 419 may also comprise an input labeled Usefulness of Information 409. Input 409 is coupled to DFM block 417 and increases the Desirability Number based on the numerical or objective input that is provided by the user. One option for the numerical input a user can provide is a number on 1 to 10 or 1 to 100 number scale provided through a control widget (a small popup window) with small field which accepts numerical entry by the user, and another option may be to select from choices provided in a menu, such as "highly relevant", "moderately relevant", "not very relevant", "no relevance". The use input may of course be processed or scaled in some manner before influencing the Desirability Number.

The Evaluation Inputs 419 may also comprise inputs called "Back" hit 411 and "Next" hit 413. These inputs 411 and 413 are provided to the desirability function module (DFM) block 417 and have direct impact on the Desirability Number 209 of FIG. 2, possibly in some processed or weighed manner. A large frequency of "Back" hit and "Next" hit operations recorded around a given page has a negative impact on the Desirability Number of a given page, as the user apparently doesn't want to spend time on that page. The frequency of "Back" and "Next" hits may have more relevant or more weighted meaning from the perspective of the inputs that the other inputs such as "Link Steps on a Page 405," etc. Therefore, certain inputs may be weighted stronger and weaker relative to each other.

The Evaluation Inputs 419 also comprises the input referred to as "Other Inputs 415" which is provided to DFM block 417. Input 415 refers to miscellaneous inputs that have direct, computed, or weighted impact on the Desirability Number 209 of FIG. 2. In one embodiment, these inputs and their impact (negative or positive) on the Desirability Number can be user defined through a dropdown list with an option to specify their effect (negative or positive). In some cases, a "control panel" can be provided that allow the user to change weighting, applicability, or specific application of an input to the DFM 417. This user definition can be reset to a default options built into the search engine, and an interface can be provided to allow the user to specify certain characteristics that the SE should process and/or monitor. Also, these option settings can be considered and built into a user search criteria definition.

Figure 5:
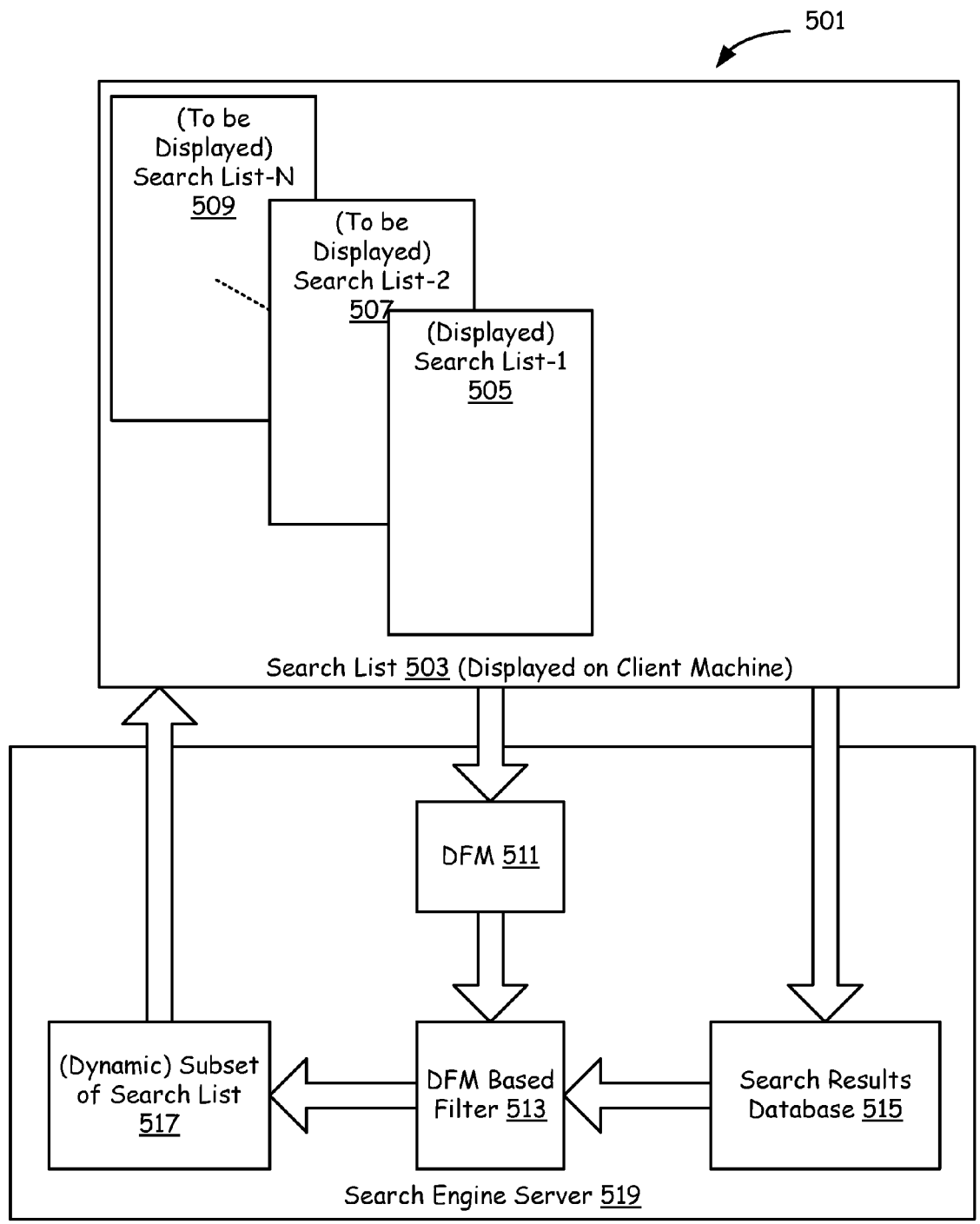
FIG. 5 is a functional block diagram illustrating the principle of adapting the search engine (SE) as a closed loop system.

FIG. 5 is a functional block diagram 501 illustrating the principle of adapting a search engine as a closed loop system. Upon entering the search string in the search engine window of the Network Browser 111 of FIG. 1, a big Search List 503 will be generated which will remain paginated (e.g. 10 links or some other limited number of links for page), with the first page displayed as SearchList-1 505. The other pages or subsequent search lists portions remain hidden until a "Next" button or option is hit, at which time the next list to be displayed, such as Search List-2 507, is displayed or selected. This process can continue subject to the "back" and "next" inputs from the user to display other lists of search results, such as Search List-N 509.

When a link on the Search List-1 505 is clicked to open its page, then the Evaluation Inputs 419 of FIG. 4 will begin to be collected, in the meantime the Processing Circuitry 119 of FIG. 1 executes the desirability number function in desirability function module (DFM) 511 (similar to DFM 317 of FIG. 3) to compute the Desirability Number (see FIG. 2 or 3), which will be tagged to or associated with the current Webpage or search result. Then, the Processing Circuitry 209 of FIG. 2 will run an internal algorithm on the Search List 503 to generate Desirability Numbers to attribute to each link (based on their contents), in the Search List 503. This process can take on one of many different forms.

In a first embodiment, the processing circuitry 209 can scan the current search result or web pages to find characteristics or content of interest in the web site that relate statistically to the search terms or past actions of the user (past pages what were skipped or searched more intently by the user). For example, if the user entered a search string "football game", and skipped all pages associated with this weekend's pro football games but drilled down in links and spent time on a webpage or more webpages with content related to football regulations and rules, the SE would deduce that the user is likely looking for regulatory content as opposed to game day information and set desirability numbers in the search list 503 accordingly. Those pages that the system scans to find regulatory content can be flagged with a higher desirability number in the list 503 and therefore identified as more relevant or percolated up to the top of the search list stack on the client machine.

In other embodiments, certain types of content may be what the user is focusing on. For example, the user may spend more time watching Youtube movies or video clips tagged with particular metadata related to the search string. Or, the user may spend more time clicking on ads, reading text files, listening to an MP3 or browsing certain photographs. In these cases where content appears to the "attractor" for the user's "stickiness" to this page, then other pages or search results in list 503 with similar content can be tagged with higher desirability numbers.

Other factors such as the source of information, geographic limitations, language content, and other characteristics may be being favored by the user, and this statistical favoring can be used by the system 501 to set higher desirability numbers for similar content found within the list 503.

In another embodiment, or in addition to the aforementioned process for assigning desirability number in the list 503, user profiles can also be used, or logistics related to the user may be used to better present meaningful and quality search result to the user. For example, the users profile and/or past searching may focus largely on a business or a personal interest in automobiles. So, in this case, if the user searches on "engines," an assumption can be made that the user is searching for car engines, not boat engines, for example. Also, if the user is in a certain environment (home or at work) or has recently done certain searches on a topic that correlate to the current search, this information can be used to set desirability factors. For example, if the user is at work and has been performing nanotechnology research and searches for months in the job, the system may be able to weigh certain search results that relate to that domain of information to higher desirability numbers.

In addition to "positive" information (i.e., information regarding what the user is interested in) being used to set desirability numbers, "negative" information (i.e., the material that the user is skipping quickly over or ignoring entirely may be equally useful in setting desirability numbers . . . or example, if the user is doing a search on "cats and dogs" but stopping on all the pet store related search content while skipping veterinarian content and webpages, this information may be used to move content that is determined to be largely or primary related to veterinarian content down lower in the desirability rankings.

In addition, the content on the Intranet is becoming more multi-media every day. Software already exists to process sound and pattern-recognize/detect its origin. Pattern recognition is routinely used for visual media, such as MPEG files, JPEG, and other media files, and like digital content. Such algorithms can be deployed to determine the multimedia content of sound, video, picture, and other content that may be attractive or unattractive to a user and/or his search criteria. This intelligence can then be used to influence weighed variables that are used to set the desirability factor. Armed with the new desirability numbers, and based on the current search criteria and content of each page, a Desirability Number based Filter 513 processes through the original Search List 503 to either narrow down this list material or to better prioritize and sort the material to create a Subset of Search List 517 in the Search Engine Server 519 (similar to SE Server 105 of FIG. 1). This new list 517 can then be displayed or entirely replace other lists in search list 503 on the Client Machine 121 of FIG. 1 or somewhere else in memory of the system 101. This Subset of Search List 517 will remain in place until the user changes the search string, engages in more interactive behavior with the client device, or again processes more links, in which case the process discussed with respect to FIG. 5 can iterate. After the complete browse session, the Search List 503 will be stored in the Search Result Database 515, so that the system can process other user searches or requests with similar or identical search string data and desirability data at a later time.

Figure 6:
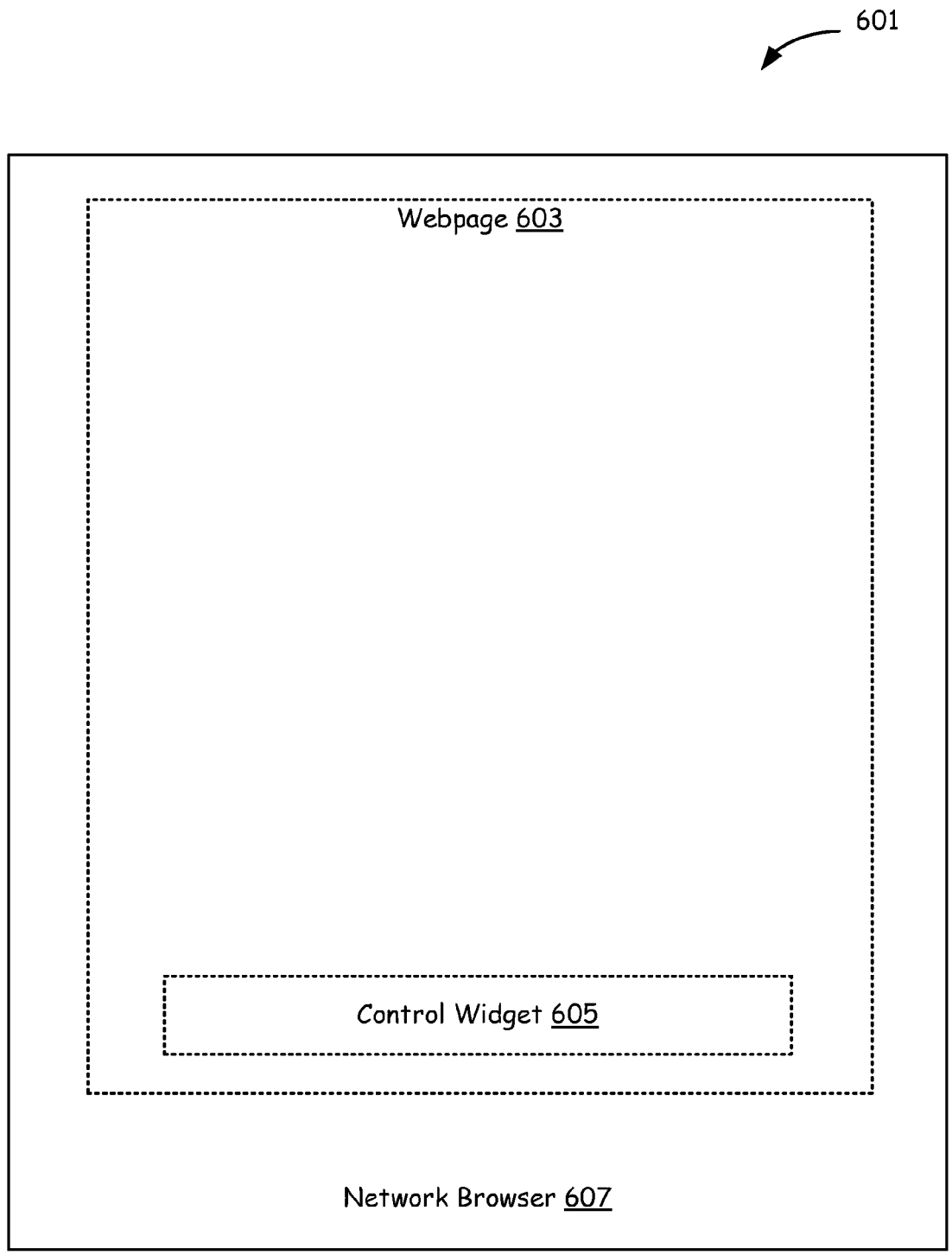
FIG. 6 is a functional block diagram illustrating the principle of control widget for the user to enter the usefulness of the page from the client terminal (finally saved in the search engine database)

FIG. 6 is a functional block diagram 601 illustrating the principle of using control widget for the user to enter, usually via the client device, one or more indicators of usefulness for a page or search result that the client is currently viewing. A Control Widget 605 is a built-in feature to the Search Engine or a program that supports the search engine or client machine, and it is preferably opened in a Network Browser 607 (111 of FIG. 1 repeated) optionally by the user, when the machine feels it needs desirability assistance, or automatically on enablement of the browser (e.g., a permanent option in a tool bar or sub-window to the browser). Upon opening a Webpage 603, by clicking on the corresponding link in the Search List-1 505 of FIG. 5, a user can go through the page in detail, after which he has an option to express his opinion on the usefulness of that page via the control widget 605. Entering of the usefulness (maybe in the form of a ranking number, answering certain alphanumeric questions, or other input protocols) can be done through the Control Widget 605, which can be routed within the software and/or hardware within the client or system as one of the Evaluation Inputs 419 of FIG. 4.

Finally, these user-defined attributes on a webpage in question can be tagged with the webpage or its link or stored somewhere in association with the webpage, search result, or link and/or stored in the search Database 305 of the Search Engine Server 315 of FIG. 3.

Figure 7:
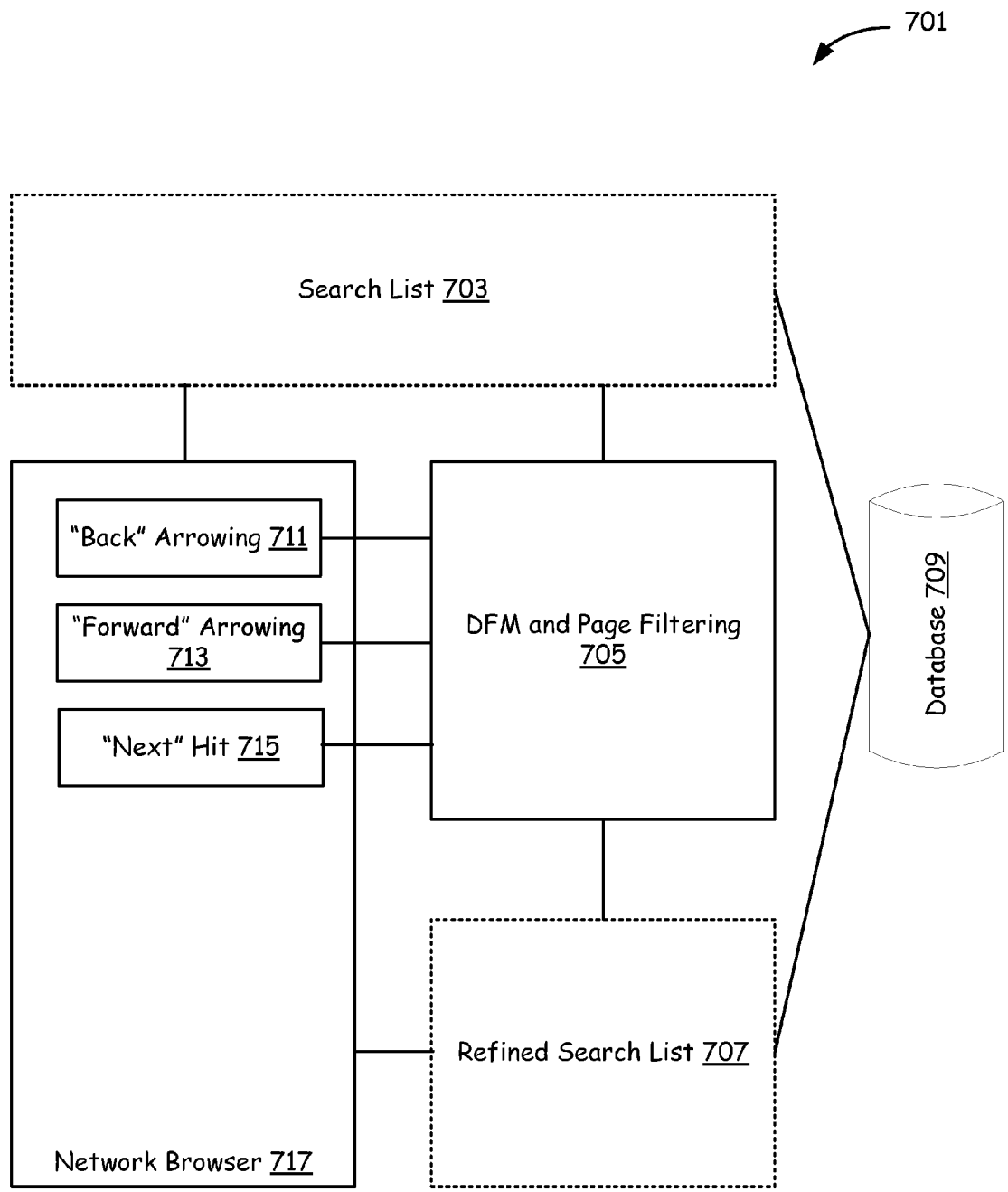
FIG. 7 is a functional block diagram of search engine emphasizing the rapid adaptability features due to immediate "Back" arrowing and "Next" hit.

FIG. 7 is a functional block diagram of a search engine emphasizing the rapid search adaptability that can occur by using the "Back" arrowing and "Next" arrowing (page list) features. Normally user enters the search string in the Search field of the Search Engine. Upon entering of the search field string and/or related info, the search process begins and a large paginated search list will be generated. Links contained within the search results are often nested one in another, one search result leading to other information or pages that may be of more or less interest to the user. "Backward" and "forward" arrows within the Network Browser 111 of FIG. 1 are normally used for browsing forward and backward through the nested links and for sometimes moving between sequential lists of search results. In this context, back arrowing and next hit on the page (e.g., selecting to move on to the next page or next sequential list of search results) should have an impact on the desirability number. The time interval between a next hit and a back hit is a measure of what the user is experiencing or expecting on the page. Also, after navigating once through the link steps, the frequency of back hits, forward hits or next hits indicates whether the user found anything of relevance on that page. If the user back hits within a small preset interval then that page and similar pages will not be short-listed or set to a high desirability number during subsequent sorts and processing. If this entry is removed from the search or prioritized to a later portion of the search list in error, as discussed previously, the user can still get back this list upon a fresh entry of the search string, change in interactive behavior, entry of improved data through the control widget, or other responses. And, the pages may be reset quickly, or bad data for desirability numbers may be backed out quickly, as these pages maybe cached somewhere. In addition, desirability numbers (DNs) may be queued or stacked over time, so that a user (who feels that the SE is going in a poor direction in terms of adaptability, can roll back the desirability numbers and the more-focused search lists to take the search in a new direction down a different path, from a more high level (e.g., less SE-processed) starting point.

Upon the entry of the search string in the Network browser 717 (same as browser 111 of FIG. 1), a large Search List 703 will be generated by the search engine, and the paginated search list will be displayed on the client machine 121 of FIG. 1. When a page is opened and/or links are followed, if the user finds no interest, he will quickly perform Back arrow 711 or Forward Arrow 713 operations to skip that page or that content and any links related to it.

Further, if the user is not satisfied with the current subset of the search list or the current page, he will perform Next Hit 715 operation, to enter next subset of the search results to enter into search list-1 507 to search list-N 509 of FIG. 5, thereby discounting a lot of the content on the prior relatively unused search list segment. In any of these situations, the page and links on that "ignored" or "minimally processed" search list or page will become low ranking search results in terms of desirability and those search items may be removed or moved off to the side by the SE or browser to minimize the subsequent search space via the removal of this page and/or similar pages from the search list by desirability function module (DFM) 705. This optional pairing down of the search list to remove content that is less likely to be interesting to the user helps the user get through large search spaces in a faster time with more immediate and direct access to items that are like more relevant content. This more relevant content is referred to as the Refined Search List 707, and this list 707 may change over time as it is iteratively processed in response to continued user interaction. In essence, the browsing within the refined search list 707 will become easier over time and involve hitting more and more relevant content, and the list 707 can also be used to update the Database 709 of the search engine server 105 of FIG. 1.

Figure 8:
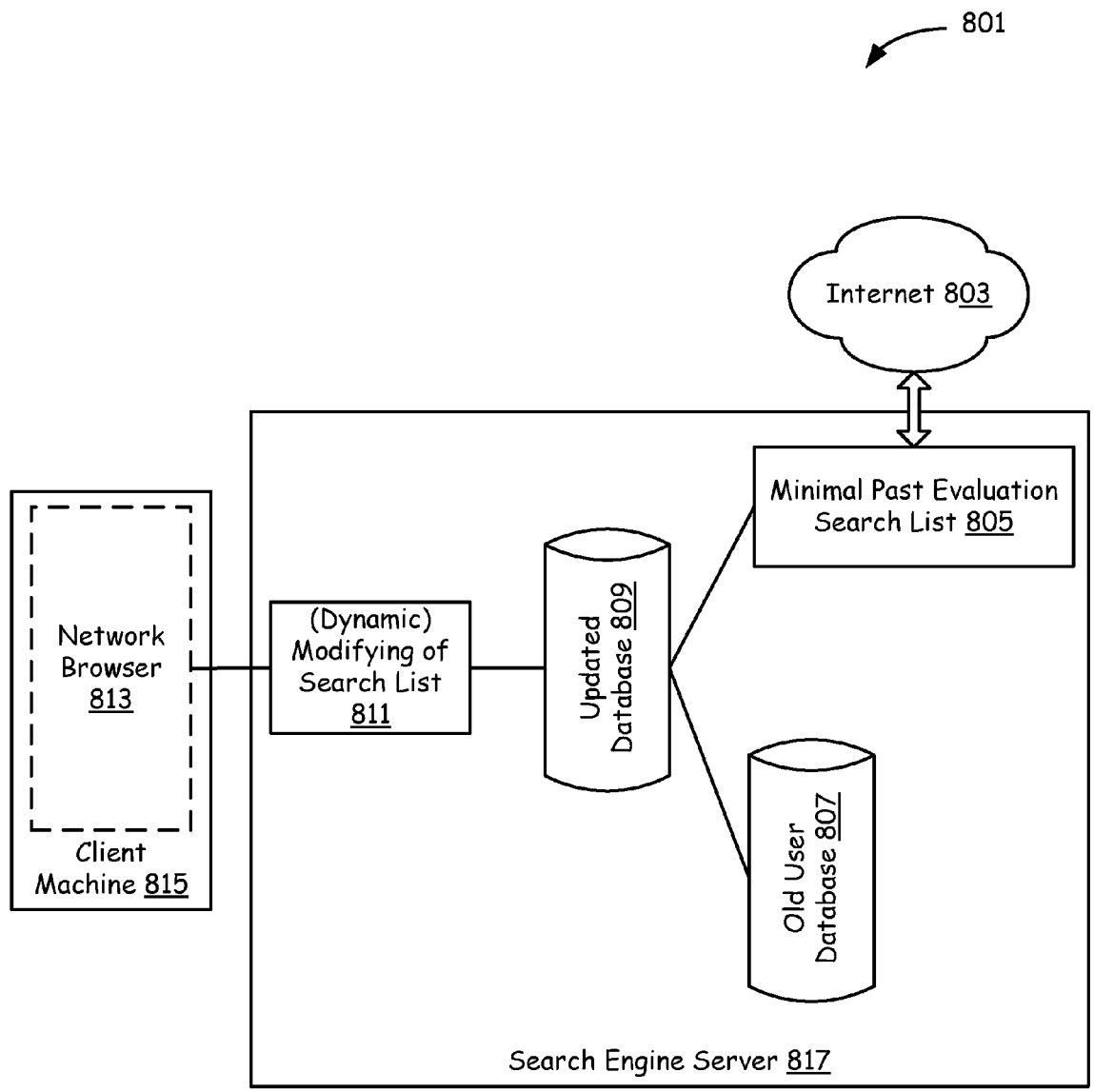
FIG. 8 is a functional block diagram illustrating the interweaving of minimal past evaluation or new pages with those pages already evaluated and existing in the database.

FIG. 8 is a functional block diagram illustrating how the systems taught here can interweave minimal past evaluated pages or search results or new webpages and search results with those webpages already significantly evaluated and existing in the search engine database. This feature is designed to catch when the remaining adapted/focused search list is getting low in number (i.e., exhausted) and the search space is not yet exhausted. This feature is also designed to catch when the desirability numbers and/or the intelligence gathered by the SE is such that new and more meaningful content can now be augmented or added to the original search list from the vast search space due to the newly-added understanding the SE has recently derived from user interaction. Therefore, this feature can operate constantly or periodically off in the background and look for new and more relevant webpages that are in current search spaces or new search spaces that can now be identified as meaningful to the user. In some cases, the user may not have known what he was searching for when beginning, but the SE now has an idea of what the user should be searching for. For example, the user may have entered "difficulty breathing" as a search term, but through the monitoring of the user interaction and reaction to content over time, the SE has determined that the user desires to see more about "mesothelioma" and specifically medical reports on the topics, and maybe more specifically medical videos with doctor feedback on the condition. Therefore, the SE is now in a state where is can refine its search over the entire (or a large share of) the search space, and vastly improve the net return of search results for the user in a higher quality manner. Over time, the system 801 in FIG. 8 can be used to insert this type of more meaningful content into the search lists for the user. In essence, when most webpages are constructed, they are associated with a set of keywords that assist in any search operation that may be performed. These keywords are not exhaustive and can statistically link to other domains or search keywords. As there are some evaluated links already existing in the search engine database, with similar and relevant keywords to the user that the user may not be aware of or that augment the user's search, it becomes possible to pool new pages continually in with the older evaluated pages that have high desirability in order to generate a fresh evaluated search list that not only contains a higher quality set of search results, but more targeted volume of these higher quality search results.

Internet 803 (similar to the Internet 103 of FIG. 1), Client Machine 815 (similar to client machine 121 of FIG. 1), and Search engine server 817 (similar to server 105 of FIG. 1) are communicatively coupled. Upon opening a search engine (SE) on the network browser 813 (111 of FIG. 1 repeated), a search string is entered to update the search list 505 of FIG. 5. This search list 805 (or search list 505 in FIG. 5) is processed by the SE to generate new desirability numbers from the more relevant pages. Based on these new numbers, a modified new search list will be generated by running the search list optimization algorithm for new web pages the SE can find that are relevant to the search criteria or search string and have high desirability numbers. In generating the updated search list, the old SE database 807 (containing old search lists 505) and the new search list 805 from the Internet are pooled according to an internal algorithm based on desirability numbers, to replace the old database 807 as updated (and more relevant) database 809.

Figure 9:
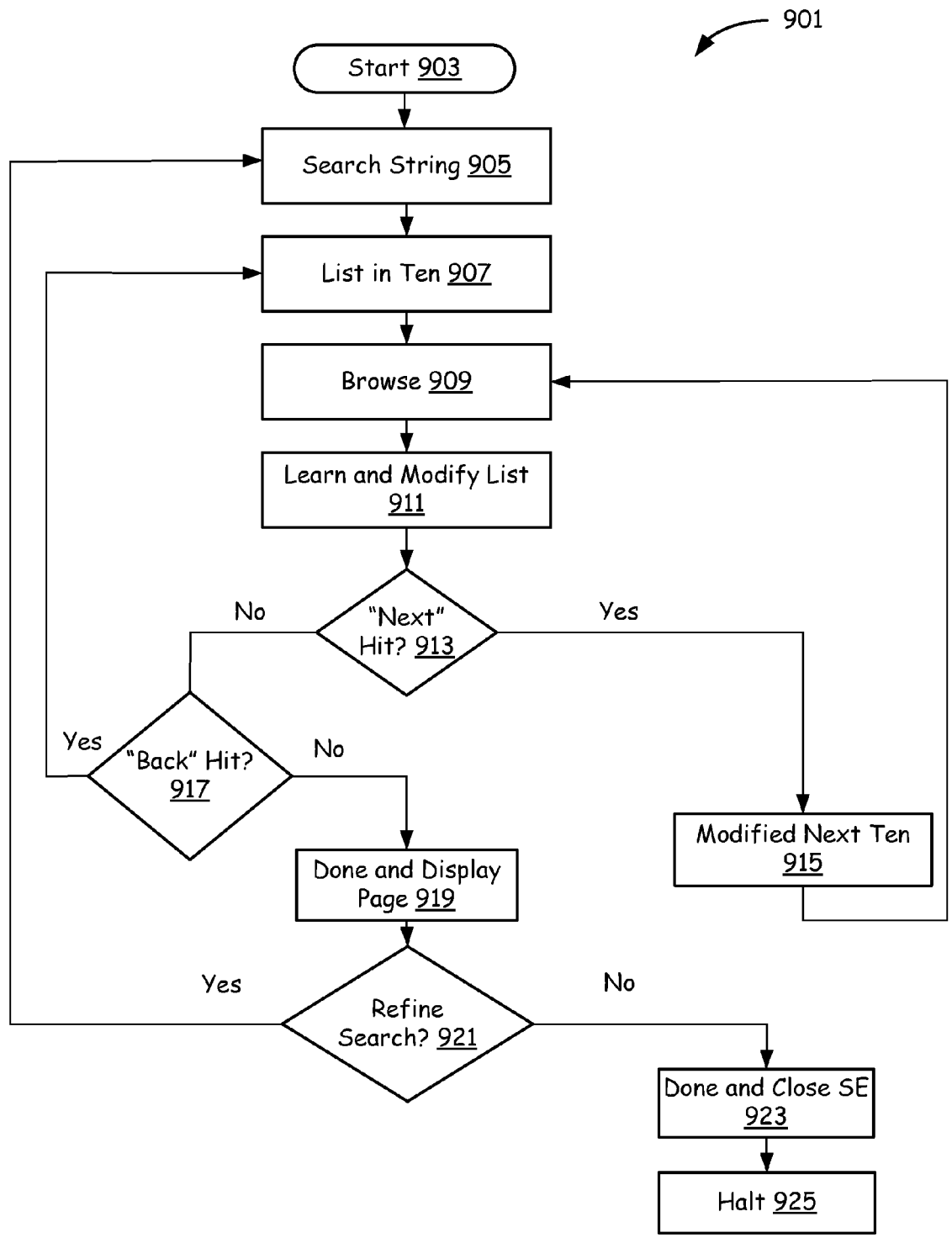
FIG. 9 is a flowchart illustrating a general sequence through which an adaptable search engine works in response to various evaluation inputs.

FIG. 9 is a flowchart 901, illustrating a general sequence through which an adaptable search engine works in response to various evaluation inputs. Normally, a "Next" button on the search list display and/or a "Back" arrow in the browser tool bar are used for a quick browse across the search list or a webpage. The "Forward" arrow will only be activated if the user already had visited pages on a link (chain), earlier. Thus, during a search session, the forward arrow is often used less compared to back arrow on the tool bar. On occasion, the forward arrow will be used during browse session when a user feels a previously visited page or the links on it, are useful, thus leading to the modification of the subsequent search lists 507 and 509 of FIG. 5, and possible changes to the desirability numbers taught herein.

The normal sequence of operations involved in an adaptable search engine starts at the block 903. Block 903 starts by opening a network browser and the search engine (SE) contained within it or associated with it. Search String 905 contains the keywords entered in the SE search field. With that information, the search operation begins and an exhaustive list of search results is gathered by the SE from its database and across the Internet (web servers). These search results are provided as paginated lists, like the List in Ten 907 (10 links per page, for example) projected by the SE to the user. The User then browses through these links as shown in the block 909 of the Flowchart in FIG. 9. Based on these user actions with the search results or pages, and other operations the user may perform on that page; evaluation inputs 419 of FIG. 4 are generated to derive the desirability number (DN) in the desirability function module (DFM) module 417 of FIG. 4. Based on the DN, the SE constantly keeps modifying the subsequent search list as shown in block 911 to reflect the user's interests according to an algorithm. The algorithm's execution, changes in the DN numbers, and other operations of the SE depend on certain operations performed by the user, for e.g. "next" hit 913 "back arrow" hit 917, ("forward arrow" hit, not indicated), etc., to provide instantaneous feedback to the SE. If a "next" hit is detected after the SE learns about the current page, a modified next ten list 915 will be displayed to the user. These modified next ten (or another amount) lists contain results that are more relevant than the previous ten results. The user will browse the subsequent information as shown in block 909 while the SE will constantly keep learning, modifying, and optimizing DN numbers and the relevance of presented search results and web pages as shown in block 911. This iterative step of seeking to provide ever more relevant information to the end user will go on in a repeated loops or iterations of this process. If the user is not interested in any of the current ten links, he may hit "back" arrow as in the decision block 917, to revert to the original first ten search lists. Now, the user can begin clicking through a different link path to repeat the aforementioned procedure.

If the user doesn't hit either the "next" button or "back arrow" on any of the opened webpages, his next option is to conclude his exploration on that page as shown in the block 919, or follow some more links on it. When the user follows further links on that page, they begin accessing a fresh search list of material and perform new browse operations via the step 909 in FIG. 9, and this repeats the aforementioned process. Following the links on a given webpage is not graphically depicted specifically in FIG. 9, but this operation is essentially the same SE learning process as shown here in FIG. 9.

At any point, if the user wants to refine his search as shown in the decision block 921, he can enter new search from block labeled 905, to repeat the SE learning down a different path or narrow down his search list in a different manner. After the search is completed and the user concludes using any references on a page, the user is done with his search and may close the process via a step 923, and close the SE and halt or suspend SE operations via a step 925.

Figure 10:
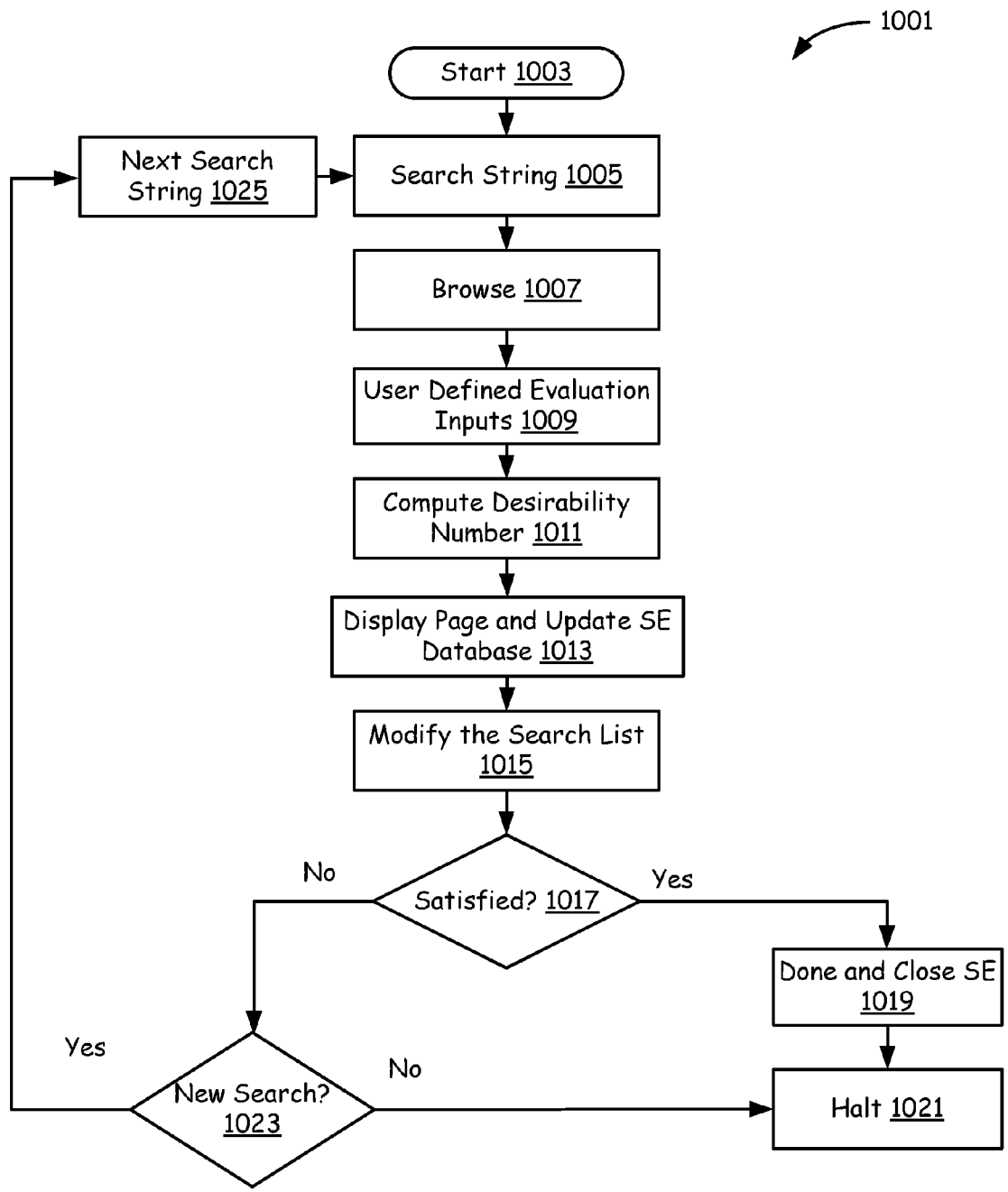
FIG. 10 is a flowchart illustrating the consideration of user defined evaluation inputs from the user through a control widget to express the usefulness of the page.

FIG. 10 is a flowchart 1001 illustrating the processing of user defined evaluation inputs from user input through a control widget to express the usefulness or desirability of the page. When a webpage or search result is opened for user's reference, the evaluation inputs for that page start to be calculated automatically in one embodiment. These inputs are computer-generated approximations or estimates of the likes and dislikes of the user for that page. According to an embodiment of the present inventions, the SE has special desirability input option in the form of a control widget interface in order to dynamically control the desirability ranking of items in a search list. Through the control widget, the user can rate the current page or other selected pages on a number scale and can even add some comments for later reference or computer automated processing. The control widget can also enter in other forms of information, like rank ordering the page to other pages, filling out a quick question input panel that can help the computer better compute desirability numbers, etc. The entry of data in a control widget may add to the history of that page in the archival stored database or the current computer main memory. According to one embodiment of the present invention, this page history is a small user defined attribute tagged to the page like the desirability number (DN). If another user visits and enter his evaluation or definition to that page, this history maybe overwritten, added to, or specially get appended or augmented depending on the number of bytes available for this purpose. In case it is appended, the number scale ratings can be averaged or a latest value can be considered for computing overall rating in the form of DN, depending upon the application and/or the settings of the computer or SE.

In FIG. 10, the network browser and the search engine (SE) are started in the Starting block 1003. The search operation begins when the user types the search string into the search field, as indicated in the block 1005. A vast paginated search results (e.g. 10, 25, 100, or more results for page) in the form of links or some other descriptor or abbreviation are generated, and the user is prompted with the first page or allowed through a user interface to open a starting search page or result. If the user obtains some level of confidence in a particular link or search result, the user opens that page, to initialize the browse operation, as in block 1007. Automatically, the evaluation inputs starts for that page. During browsing, the user's input via a control widget can be entered and applied and he can enter his numerical rating, other data, and comments regarding that page per the block 1009. In one embodiment, the control widget can be opened and closed by the user or an even within the SE when the computer determines that it needs assistance to better determine desirability. On closing, this numerical rating and/or other user input data can become one of the evaluation inputs along with others inputs evaluated when deriving the DN for that page, as in the block 1011. Subsequently, the page history will get updated into the SE database for later reference, as in the block 1013. Simultaneously, the search list will get modified or re-prioritized based on the computed DN by the DFM circuitry and/or software, as discussed earlier, and indicated via the block 1015. If the user is satisfied with the results and information, the user may go further in his searching and browsing operations, using the modified or re-prioritized list, as indicated in the decision block 1017. The user can close the search session by closing the pages and also search engine or otherwise stopping the search operation as indicated in the block 1019, and finally halt at 1021 if all related operations with the computer are completed. As an alternate option or requirement, the user may still try to refine or redirect the search or work he is doing with new search strings based on new or changed information, as in the decision block 1023. If this is done, the whole process will repeat from the block 1005, with new or modified search string.

As one of ordinary skill in the art will appreciate, the terms "operably coupled" and "communicatively coupled," as may be used herein, include direct coupling and indirect coupling via another component, element, circuit, object, software component, or module where. For indirect coupling, the intervening component, element, circuit, or module may not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been defined in a certain embodiment to portray one embodiment herein for convenience of description. However, alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been defined for convenience of description and to set forth one embodiment. Alternate boundaries could be defined as long as the certain significant functions are appropriately performed. Similarly, flow diagram blocks may also have been defined in one order, subdivision, and flow herein to illustrate certain functionality of one embodiment. The flow diagram block boundaries and sequence could have been defined otherwise and still perform the same or substantially same functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software, software modules, firmware, electromechanical devices, other apparatus, and the like or any combination thereof.

Given the advent of distributed computing, the functions and functional blocks illustrated in the drawings may reside in either the server of the end user client device or other hardware. Over today's Internet, the computation and coordination of various functions can be located server side where the server supports more "dumb" terminals, can be located client side in more powerful client devices with little or no server computation needed other than occasional synchronization operations, can be cluster process across many servers and/or peer-to-peer client devices, or combinations thereof. Therefore, the computing device that performs the functions and operations set forth herein may reside in different locations across the Internet and across networked systems, both wireless and wire-lined, and may be different types of devices varying from portable devices, to laptops, to desktops, to workstations, to servers, to cluster computers, and other systems.

The desirability number set forth herein is described primarily as a number, but this indicator can be any data indicator of relative desirability and can be alphanumeric or some of other form of data. Herein, the objects being searched are often referred to as web pages, but any data object can be the subject of a search. A search can be on numbers, text, multimedia, pictures, sound files, video, shapes, or others media stored and processed over the Internet.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A computing device comprising:
  a communication interface;
  memory; and
  processing circuitry coupled to the communication interface and to the memory, the processing circuitry, memory, and communication interface configured to:
    receive first search criteria from a user device of a first user;
    determine search results based upon the first search criteria that include a first subset of the search results and a second subset of the search results;
    transmit the first subset of the search results to the user device of the first user;
    for a plurality of selected search results:
      receive a desirability indication from the user device of the first user that indicates the first user's interaction with a selected search result of the first subset of the search results;
      process the desirability indication along with information regarding the first subset of the search results to generate desirability data;

associate the desirability data with the selected search result;

process the desirability data for the plurality of selected search results and information regarding the first subset of the search results to determine a third subset of the search results that differs from both the first subset of the search results and the second subset of the search results; and determine other search results for a second user based upon second search criteria received from a user device of the second user that are similar to the search criteria and the desirability data for the plurality of selected search results created based upon the user interaction of the first user.

2. The computing device of claim 1, wherein the second search criteria is the same as the first search criteria.

3. The computing device of claim 2, wherein the other search results comprise the third subset of the search results.

4. The computing device of claim 1, wherein the desirability indication comprises user interaction by the first user with the selected search results.

5. The computing device of claim 1, wherein the computing device is a server system configured to perform searches.

6. The computing device of claim 1, wherein the search results are prioritized differently over time.

7. The computing device of claim 1, wherein the desirability indication received from the user device of the first user is stored by the computing device for use in processing other search criteria from other users.

8. The computing device of claim 1, wherein the third subset of the search results is derived from the search results by assigning desirability data to the other search results that is based on content type and user interaction with selected search results.

9. The computing device of claim 1, wherein the desirability indication is based on at least one of the following:
    a time period the first user spends on a page;
    a time period the first user spends reviewing certain content;
    a type of content viewed by the first user;
    link usage by the first user;
    next and back button operations performed by the first user; or
    content skipped over by the first user.

10. A method for operating a computing device comprising:
    receiving first search criteria from a user device of a first user;
    determining search results based upon the first search criteria that include a first subset of the search results and a second subset of the search results;
    transmitting the first subset of the search results to the user device of the first user;
    for a plurality of selected search results:
        receiving a desirability indication from the user device of the first user that indicates the first user's interaction with a selected search result of the first subset of the search results;
        processing the desirability indication along with information regarding the firs subset of the search results to generate desirability data;
        associating the desirability data with the selected search result;
        process the desirability data for the plurality of selected search results and information regarding the first subset of the search results to determine a third subset of the search results that differs from both the first subset of the search results and the second subset of the search results; and
        determine other search results for a second user based upon second search criteria received from a user device of the second user that are similar to the search criteria and the desirability data for the plurality of selected search results created based upon the user interaction by the first user.

11. The method of claim 10, wherein the second search criteria is the same as the first search criteria.

12. The method of claim 11, wherein the other search results comprise the third subset of the search results.

13. The method of claim 10, wherein the desirability indication comprises user interaction by the first user with the selected search results.

14. The method of claim 10, wherein the search results are prioritized differently over time.

15. The method of claim 10, wherein the desirability indication received from the user device of the first user is stored for use in processing other search criteria from other users.

16. The method of claim 10, wherein the third subset of the search results is derived from the search results by assigning desirability data to the other search results that is based on content type and user interaction with selected search results.

17. The method of claim 10, wherein the desirability indication is based on at least one of the following:
    a time period the first user spends on a page;
    a time period the first user spends reviewing certain content;
    a type of content viewed by the first user;
    link usage by the first user;
    next and back button operations performed by the first user; or
    content skipped over by the first user.

18. A method for processing a search request comprising:
    initiating a search for search results based upon user-entered search criteria;
    assembling the search results into a search list;
    outputting the search results via a communication interface and under control of processing circuitry for eventual review by a user;
    calculating desirability values for the search results based on user interaction by the user with one or more search results over time;
    tagging the search results with the desirability values to generate tagged search results;
    archiving the tagged search results;
    using the desirability values to identify second search results for the user by deleting undesirable search results from the search results, adding more desirable search results to the search results, and prioritizing and presenting the more desirable search results;
    repeating the steps of setting and using over time to further refine the search results over time to continually process search results in a search space to provide more desirable content for review by the user;
    in response to user input, rolling back the desirability values associated with one or more search results to a previous state indicated by archived desirability values; and
    determining search results for a different user based upon at least one other search term received from the different user that is similar to the user-entered search criteria and the rolled-back desirability values.

19. The method of claim 18, wherein the desirability values are calculated based on at least one of the following:
   a time period the user spends on a page;
   a time period the user spends reviewing certain content;
   a type of content viewed by the user,
   link usage by the user,
   next and back button operations performed by the user, or
   content skipped over by the user.

* * * * *